(12) United States Patent
Pitts et al.

(10) Patent No.: US 8,262,120 B1
(45) Date of Patent: Sep. 11, 2012

(54) TRAILER COUPLER

(76) Inventors: John G. Pitts, Belton, TX (US);
Kristopher Michael Lake, Austin, TX (US); Jason Allen Ludlam, Kileen, TX (US)

(*) Notice: Subject to any disclaimer, the term of this patent is extended or adjusted under 35 U.S.C. 154(b) by 297 days.

(21) Appl. No.: 12/798,745

(22) Filed: Apr. 12, 2010

Related U.S. Application Data

(60) Provisional application No. 61/214,596, filed on Apr. 27, 2009.

(51) Int. Cl.
*B60D 1/36* (2006.01)
(52) U.S. Cl. ........ 280/477; 280/511; 340/431; 340/435; 348/148
(58) Field of Classification Search .......... 280/477, 280/504–511
See application file for complete search history.

(56) References Cited

U.S. PATENT DOCUMENTS

| | | | |
|---|---|---|---|
| 5,650,764 A * | 7/1997 | McCullough | 340/431 |
| 6,386,572 B1 | 5/2002 | Cofer | |
| 6,874,806 B1 * | 4/2005 | Blake | 280/507 |
| 6,970,184 B2 * | 11/2005 | Hirama et al. | 348/148 |
| 7,171,769 B2 | 2/2007 | Schultz et al. | |
| 7,195,267 B1 | 3/2007 | Thompson | |
| 7,309,075 B2 | 12/2007 | Ramsey et al. | |
| 2005/0128059 A1 * | 6/2005 | Vause | 340/431 |
| 2006/0255560 A1 * | 11/2006 | Dietz | 280/477 |

* cited by examiner

*Primary Examiner* — Kevin Hurley
(74) *Attorney, Agent, or Firm* — Patent & Trademark Services, Inc; Joseph H. McGlynn

(57) ABSTRACT

A trailer coupler which has two cameras mounted at right angles at the rear of the towing vehicle. The cameras transfer images to a monitor inside the cab of the towing vehicle.

20 Claims, 2 Drawing Sheets

TRAILER COUPLER

Applicants claim priority for Provisional application Ser. No. 61/214,596, filed Apr. 27, 2009.

BACKGROUND OF THE INVENTION

This invention relates, in general, to trailer accessories, and, in particular, to a trailer accessory for coupling a trailer to a towing vehicle.

DESCRIPTION OF THE PRIOR ART

In the prior art various types of trailer accessories have been proposed. For example, U.S. Pat. No. 7,309,075 to Ramsey et al discloses a trailer coupler which uses a single camera attached to the rear of the towing vehicle (see col. 8, lines 5-7).

U.S. Pat. No. 7,195,267 to Thompson discloses a trailer coupler which uses a single video camera, a transmitter and a light to transmit an image to a monitor in the cab.

U.S. Pat. No. 7,171,769 to Schultz et al discloses a trailer coupler which uses a single video camera.

U.S. Pat. No. 6,386,572 to Cofer discloses a trailer coupler which uses an optical guide.

Users of trailers have difficulty in aligning the towing vehicle's hitch with the trailer hitch. The user must align the hitches of the two vehicles at least one of which is out of sight from the driver's seat. Generally two people are needed to align the two hitches; one the driver and the other person outside of the vehicle where he can see the two hitches and signal the driver in how to maneuver the towing vehicle.

However, if the user is alone the process becomes much more difficult. The user must back the vehicle up, get out and check its alignment, back up some more, get out to check the alignment, and so on until the process is completed. Therefore, there is a need for an alignment system that allows a user to conveniently and precisely align a trailer hitch with the towing vehicle hitch.

Prior art devices such as the patent to Ramsey et al (U.S. Pat. No. 7,309,075) have used a single camera to allow the user to view the area behind the towing vehicle, however, the single camera gives an, essentially, two dimensional view, which is inadequate in a three dimensional world.

SUMMARY OF THE INVENTION

The present invention is directed to a trailer coupler which has two cameras mounted at right angles at the rear of the towing vehicle. The cameras transfer images to a monitor inside the cab of the towing vehicle.

It is an object of the present invention to provide a new and improved trailer coupler.

It is an object of the present invention to provide a new and improved trailer coupler which can be installed in a new vehicle or retrofitted to an older vehicle.

It is an object of the present invention to provide a new and improved trailer coupler which uses multiple visual devices to provide an improved coupling guide.

These and other objects and advantages of the present invention will be fully apparent from the following description, when taken in connection with the annexed drawings.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
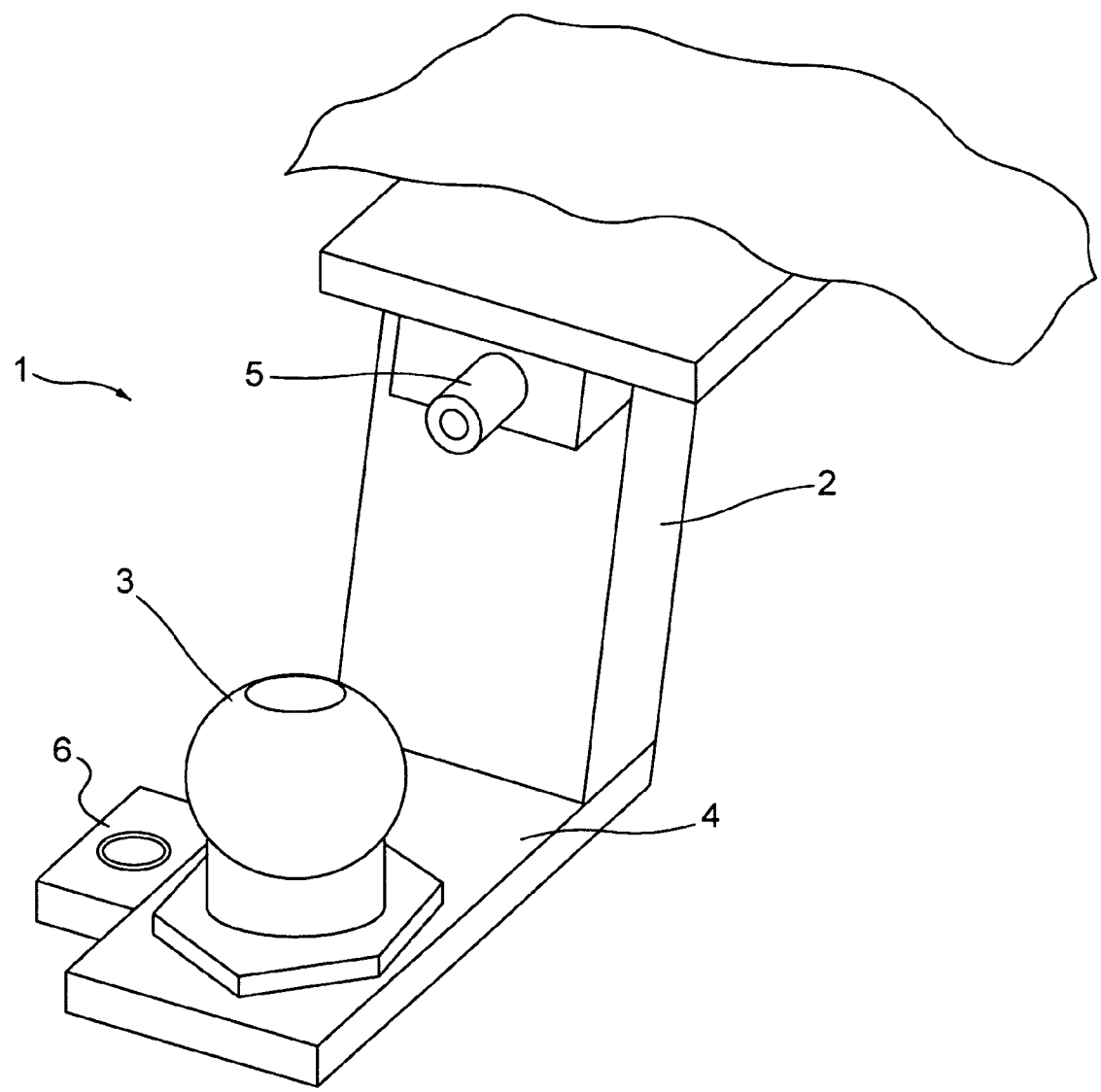
FIG. 1 is a perspective view of the cameras of the system of the present invention mounted on a trailer hitch.

Referring now to the drawings in greater detail, FIG. 1 shows a perspective view of the present invention 1. The towing vehicle hitch is a conventional hitch having a horizontal portion 4 attached to a vertical portion 2 which is, in turn, attached to a towing vehicle (not shown) by any conventional method. A conventional trailer ball 3 is secured to the horizontal portion 4 in any conventional manner. Since the towing vehicle hitch and the method of attachment are conventional no further description is necessary.

A first camera 5 is secured to the vertical portion 2 of the towing vehicle hitch and is pointed rearwardly at the ball 3. This camera will allow the operator to view the hitch and determine whether the operator should move the towing vehicle right or left in order to align with the corresponding hitch on the trailer. However, the single camera gives basically a two dimensional view and the operator will still have some difficulty in aligning the vehicles in order to couple the towing vehicle hitch and the trailer hitch due to a lack of perspective.

In order to alleviate this difficulty a second camera 6 is mounted on the horizontal portion 4 of the towing vehicle hitch by any conventional method. The second camera is mounted approximately horizontally of the portion 4 of the towing vehicle hitch and the ball 3. The view from the second camera along with the view from the first camera will provide the operator with a perspective view to align the towing vehicle hitch with the trailer hitch.

Figure 2:
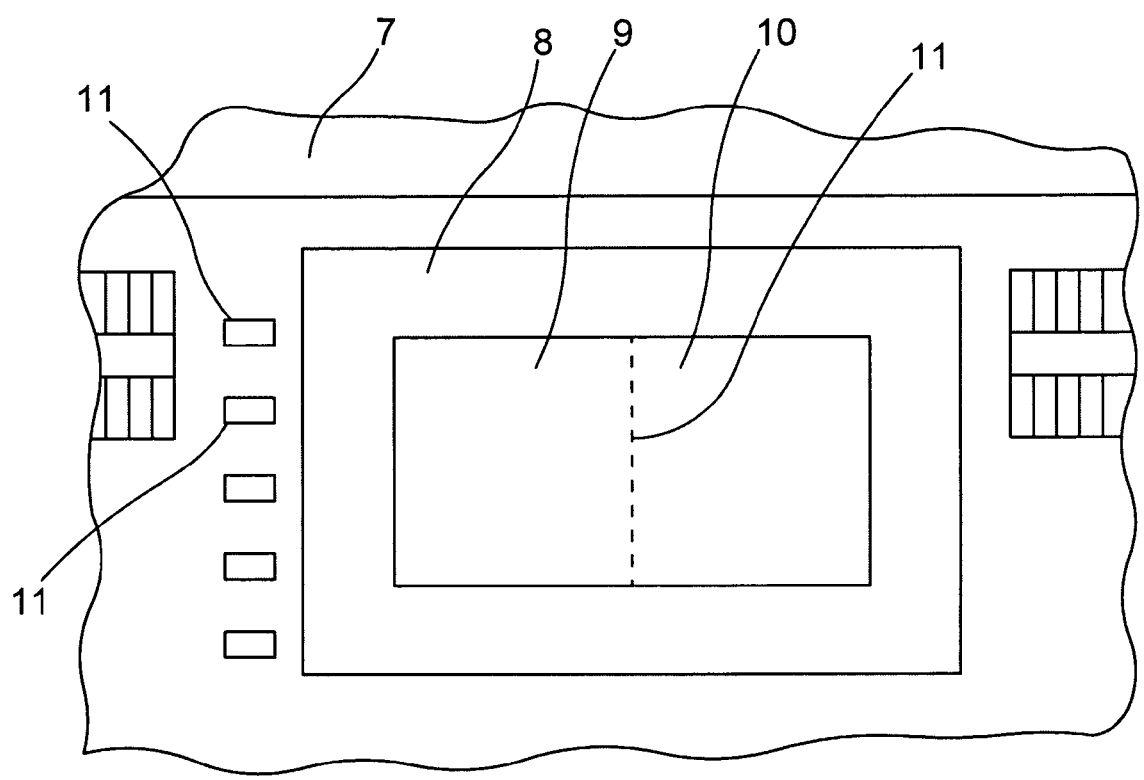
FIG. 2 is a view of the viewing screen of the system of the present invention.

FIG. 2 shows a screen 8 mounted within a vehicle dashboard 7. It should be noted that while the screen is shown as being mounted within a dashboard this is not critical. The screen could be mounted on the exterior of the dashboard and secured thereto in any conventional manner. Controls 11 are mounted adjacent to the screen and will control various aspects of the screen such as brightness, contrast, etc.

Conventional wiring or a wireless camera will be used to electronically connect the cameras 5, 6 to the screen 8. The screen, as shown in FIG. 2, is divided by an imaginary dotted line 11 to indicate two portions. The view of camera 5 could be shown on the left hand side of the screen 9 and the view from the camera 6 could be shown on the right hand side 10 of the screen. This would give the operator views from both cameras simultaneously. It should be noted that the side of the screen showing camera 5 and the side showing camera 6 have been selected randomly and if so desired the view form camera 5 could be shown on the right side 10 of the screen and the view from camera 6 could be shown on the left side 9 of the screen without departing from the scope of the invention.

If an operator found the views from both cameras at the same time to be confusing he could use one of the controls 11 to switch from showing both cameras to showing first camera 5 and then switching to camera 6. The controls would allow him to switch from camera 5 to camera 6 manually or the controls could allow the screen to switch automatically from one camera to the other. In addition, the controls could allow the operator to select a timing sequence. For example, a timer could allow the view from camera 5 to stay on the screen for a selected period of time, then switch to the view from camera 6 for a selected period of time. The operator would be able to select the amount of time the views would appear on the screen, and then the operation would become automatic.

Although the Trailer Coupler and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

We claim:

1. A trailer coupling system for assisting in aligning a hitch on a towing vehicle with a complimentary part on a trailer, wherein said system comprises:
   a hitch adapted to be attached to a towing vehicle,
   said hitch having a first portion connected to a second portion,
   said first portion having means for securing said hitch to a towing vehicle,
   said second portion having means for securing a trailer to said hitch,
   said first portion having means for capturing an image of said means for securing said hitch to a towing vehicle, and
   said means for capturing an image having means for transferring said image to a remote location, and
   said second portion having means for capturing another image of said means for securing said hitch to a towing vehicle, and
   said means for capturing another image having means for transferring said another image to a remote location, and
   wherein said image and said another image are different views of said means for securing a trailer to said hitch.

2. The trailer coupling system as claimed in claim 1, wherein said means for capturing an image of said means for securing said hitch to a towing vehicle is a camera.

3. The trailer coupling system as claimed in claim 1, wherein said means for capturing another image of said means for securing said hitch to a towing vehicle is a camera.

4. The trailer coupling system as claimed in claim 1, wherein said means for capturing an image of said means for securing said hitch to a towing vehicle is mounted in a position above said means for securing said hitch to a towing vehicle.

5. The trailer coupling system as claimed in claim 1, wherein said means for capturing another image of said means for securing said hitch to a towing vehicle is mounted in a position beside said means for securing said hitch to a towing vehicle.

6. The trailer coupling system as claimed in claim 1, wherein said means for capturing an image of said means for securing said hitch to a towing vehicle is mounted in a position vertically above said means for securing said hitch to a towing vehicle and is aimed downward.

7. The trailer coupling system as claimed in claim 1, wherein said means for capturing another image of said means for securing said hitch to a towing vehicle is mounted in a position horizontally adjacent said means for securing said hitch to a towing vehicle.

8. The trailer coupling system as claimed in claim 1, wherein said means for capturing an image of said means for securing said hitch to a towing vehicle transmits a view to a screen in a position remote from said means for capturing an image.

9. The trailer coupling system as claimed in claim 1, wherein said means for capturing another image of said means for securing said hitch to a towing vehicle transmits another view to a screen in a position remote from said means for capturing an image.

10. The trailer coupling system as claimed in claim 1, wherein said means for capturing an image of said means for securing said hitch to a towing vehicle transmits a view to a screen in a position remote from said means for capturing an image, and
    wherein said means for capturing another image of said means for securing said hitch to a towing vehicle transmits another view to said screen.

11. The trailer coupling system as claimed in claim 10, wherein said means for capturing an image of said means for securing said hitch to a towing vehicle transmits a view to a portion of said screen, and
    wherein said means for capturing another image of said means for securing said hitch to a towing vehicle transmits another view to another portion of said screen.

12. The trailer coupling system as claimed in claim 10, wherein said means for capturing an image of said means for securing said hitch to a towing vehicle transmits a view to a portion of said screen, and
    wherein said means for capturing another image of said means for securing said hitch to a towing vehicle transmits another view to a portion of said screen at the same time.

13. The trailer coupling system as claimed in claim 10, wherein said means for capturing an image of said means for securing said hitch to a towing vehicle transmits a view to said screen, and
    wherein said means for capturing another image of said means for securing said hitch to a towing vehicle transmits another view to said screen, and
    said system has means for switching from said view to said another view.

14. The trailer coupling system as claimed in claim 13, wherein said means for switching from said view to said another view has a timer which automatically performs said switching.

15. A trailer coupling system for assisting in aligning a hitch on a towing vehicle with a complimentary part on a trailer, wherein said system comprises:
    a hitch adapted to be attached to a towing vehicle,
    said hitch having a first portion connected to a second portion,
    said first portion having means for securing said hitch to a towing vehicle,
    said second portion having means for securing a trailer to said hitch,
    said first portion having means for capturing an image of said means for securing said hitch to a towing vehicle, and
    said means for capturing an image having means for transferring said image to a remote location, and
    said second portion having means for capturing another image of said means for securing said hitch to a towing vehicle, and
    said means for capturing another image having means for transferring said another image to a remote location, and
    wherein said image and said another image are different views of said means for securing a trailer to said hitch, and wherein said means for capturing an image of said means for securing said hitch to a towing vehicle is mounted in a position above said means for securing said hitch to a towing vehicle, and wherein said means for capturing another image of said means for securing said hitch to a towing vehicle is mounted in a position beside said means for securing said hitch to a towing vehicle.

16. The trailer coupling system as claimed in claim 15, wherein said means for capturing an image of said means for securing said hitch to a towing vehicle transmits a view to a portion of a screen at said remote location, and wherein said means for capturing another image of said means for securing said hitch to a towing vehicle transmits another view to another portion of said screen.

17. The trailer coupling system as claimed in claim 16, wherein said means for capturing an image of said means for securing said hitch to a towing vehicle transmits a view to a portion of said screen, and wherein said means for capturing another image of said means for securing said hitch to a towing vehicle transmits another view to a portion of said screen at the same time.

18. The trailer coupling system as claimed in claim 16, wherein said means for capturing an image of said means for securing said hitch to a towing vehicle transmits a view to said screen, and wherein said means for capturing another image of said means for securing said hitch to a towing vehicle transmits another view to said screen, and said system has means for switching from said view to said another view.

19. The trailer coupling system as claimed in claim 18, wherein said means for switching from said view to said another view has a timer which automatically performs said switching.

20. The trailer coupling system as claimed in claim 18, wherein said means for capturing an image and said means for capturing said another image are cameras.

* * * * *